(12) United States Patent
Blecon et al.

(10) Patent No.: US 9,257,119 B2
(45) Date of Patent: Feb. 9, 2016

(54) TELEPHONY SYSTEM WITH A BACKGROUND RECAPITULATION FEATURE

(71) Applicants: Stéphane Blecon, Brest (FR); Divi Laine, Brest (FR)

(72) Inventors: Stéphane Blecon, Brest (FR); Divi Laine, Brest (FR)

(73) Assignee: GENESYS TELECOMMUNICATIONS LABORATORIES, INC., Daly ( * ) Notice: Subject to any disclaimer, the term of this patent is extended or adjusted under 35 U.S.C. 154(b) by 0 days.

(21) Appl. No.: 13/764,590

(22) Filed: Feb. 11, 2013

(65) Prior Publication Data

US 2014/0050308 A1 Feb. 20, 2014

(30) Foreign Application Priority Data

Feb. 13, 2012 (EP) .................................. 12305155

(51) Int. Cl.
| | | |
|---|---|---|
| *H04M 1/64* | (2006.01) | |
| *G10L 15/26* | (2006.01) | |
| *H04M 3/42* | (2006.01) | |
| *H04M 3/56* | (2006.01) | |
| *G10L 15/00* | (2013.01) | |

(52) U.S. Cl.
CPC .......... *G10L 15/265* (2013.01); *H04M 3/42221* (2013.01); *H04M 3/56* (2013.01); *H04M 2201/40* (2013.01); *H04M 2201/60* (2013.01)

(58) Field of Classification Search
CPC ... H04M 3/42221; H04M 5/564; H04M 3/56; H04M 2203/5081; H04M 3/568; G06F 3/165; H04L 12/1822

USPC ............ 379/88.01–88.19; 704/235, 246, 249
See application file for complete search history.

(56) References Cited

U.S. PATENT DOCUMENTS

| | | | |
|---|---|---|---|
| 6,320,956 B1* | 11/2001 | Cherry ..................... | 379/265.02 |
| 6,850,609 B1 | 2/2005 | Schrage | |
| 8,654,953 B2* | 2/2014 | Boss et al. .............. | 379/202.01 |
| 2004/0081295 A1 | 4/2004 | Brown et al. | |
| 2005/0213743 A1* | 9/2005 | Huet et al. .............. | 379/265.09 |
| 2007/0211876 A1* | 9/2007 | Othmer et al. ........... | 379/201.01 |
| 2008/0075256 A1* | 3/2008 | Firestone ................. | 379/202.01 |
| 2008/0205378 A1* | 8/2008 | Wyss et al. .................... | 370/352 |
| 2010/0063815 A1* | 3/2010 | Cloran et al. .................. | 704/235 |
| 2011/0099602 A1* | 4/2011 | Apparao et al. ................. | 726/1 |
| 2011/0235797 A1* | 9/2011 | Huet et al. .............. | 379/265.09 |
| 2013/0144619 A1* | 6/2013 | Lord et al. ..................... | 704/235 |
| 2013/0159539 A1* | 6/2013 | Lindner et al. ................ | 709/228 |
| 2014/0136609 A1* | 5/2014 | Churchill et al. ............. | 709/203 |

OTHER PUBLICATIONS

European Search Report and Written Opinion for EP Application No. 12305155.9, dated Jul. 13, 2012; 6 pages.

* cited by examiner

*Primary Examiner* — Solomon Bezuayehu
(74) *Attorney, Agent, or Firm* — Christie, Parker & Hale, LLP

(57) ABSTRACT

A telephony system comprising means to establish an initial telephone call (1) between at least two initial telephone terminals (2, 3) characterized in that it further comprises:
  a call recording server (5) designed to record said initial telephone call (1),
  a speech to text engine (6) able to make a text transcription (9) of said initial telephone call (1),
  a providing mean (7) able to provide said text transcription (9) to a third telephone terminal (4).

13 Claims, 8 Drawing Sheets

TELEPHONY SYSTEM WITH A BACKGROUND RECAPITULATION FEATURE

CROSS-REFERENCE TO RELATED APPLICATION

This application claims priority to and the benefit of European Patent Application Number 12305155.9, filed on Feb. 13, 2012, the entire disclosure of which is incorporated herein by reference.

The technical domain is the domain of telephony systems. A telephony system, as is known in the art, is a server system allowing several telephone terminals to address and interconnect each other, through the establishment of a telephone call, so as to allow their respective users to able to exchange at least speech.

Such a telephone call so interconnects at least two initial telephone terminals and their users can engage in a speech conversation. Most often a telephone call links two initial telephone terminals, but it can also links three or more initial telephone terminals in what may then be named a conference call.

The problem addressed here is encountered when a third telephone terminal has to join an initial telephone call after its establishment. In that case a third user using said third telephone terminal is not aware of the subjects previously discussed between the initial users and is thus not fully operative to participate to said telephone call, until he receives a recapitulation of the content of the initial telephone call from the beginning to the joining time.

Until now such a recapitulation is typically done e.g. by speech, by at least one of the initial user typically orally recapitulating and/or summarizing the initial telephone call to the newcomer/said third user. However said process is time consuming, depending on the time elapsed since the beginning of the initial telephone call, and on the subjects previously discussed between the initial users. During this recapitulation time some of the initial users may be temporarily disconnected. In any case, the initial conversation is halted. That may be very counterproductive.

Most of all, such a recapitulation process is done by a user, and can thus hardly be faithful, since it is prone to interpretation, adaptation, and/or willing or not forgetting and/or omission.

It is thus of interest to provide a telephony system able to help a third person joining a telephone call after its beginning by allowing said third person to be aware of the subject matters previously discussed, before its joining.

The present invention addresses and solves this problem.

The object of the invention is a telephony system comprising means to establish an initial telephone call between at least two initial telephone terminals, further comprising: a call recording server designed to record said initial telephone call, a speech to text engine able to make a text transcription of said initial telephone call, a providing mean able to provide said text transcription to a third telephone terminal.

According to another feature, said call recording server is designed to automatically start recording said initial telephone call from the beginning of said initial telephone call.

According to another feature, said call recording server is designed to record said initial telephone call in speech form.

According to another feature, said call recording server is designed to record said initial telephone call in text transcription form.

According to another feature, said call recording server is designed to deliver back a recorded telephone call on demand.

According to another feature, said speech to text engine is designed to make a text transcription from said telephone call directly on the fly.

According to another feature, said speech to text engine is designed to make a text transcription from a telephone call previously recorded in speech form and delivered back.

According to another feature, said providing mean gets the text transcription either directly from said speech to text engine or from the call recording server.

According to another feature, said provider mean is designed to be triggered from any one of the initial telephone terminals, by said initial telephone terminal establishing a consultation call toward said third telephone terminal.

According to another feature, said providing mean is designed to be triggered from said third telephone terminal, by said third telephone terminal establishing an intrusion call into said initial telephone call.

Others features, details and advantages will become more apparent from the detailed illustrating description given hereafter with respect to the drawings on which:

FIGS. 1-4 illustrate four steps of a consultation scenario according to prior art, FIGS. 5-8 illustrate four steps of an intrusion scenario according to prior art, FIGS. 9-12 illustrate four steps of a consultation scenario according to an embodiment, FIGS. 13-16 illustrate four steps of an intrusion scenario according to an embodiment, FIGS. 17-19 show three organic embodiments.

In the following, a telephone terminal 2-4 is always uniquely associated to a user. For connections and computing treatments, the telephone terminal is mainly concerned. For interaction and speech, the user is mainly concerned. However, both terms "user" and "telephone terminal" are interchangeably used in the following application.

In order for a third telephone terminal 4, and its associated user 4, to join an already established telephone call 1, at least two scenarios are possible. In a first scenario called consultation scenario, the third telephone terminal 4 is called by a demand of one of the initial telephone terminal 2, 3. In a second scenario called intrusion scenario, the third telephone terminal 4 joins the already established telephone call 1 by a demand of said third telephone terminal 4/user 4. Except for the aforementioned difference, many features are shared between said two scenarios.

FIGS. 1-4 illustrate a consultation scenario, according to prior art.

FIG. 1 illustrates a first step. There, an initial telephone callus already established between at least two initial telephone terminals 2, 3. Two telephone terminals 2, 3 is a minimum to have a telephone call 1. Two is used here to keep it simple for illustrative purposes. However, a conference call is possible where the telephone call 1 links more than two such telephone terminals 2, 3.

Let us considers now, that users 2, 3, for any reason, want to carry on said initial telephone call 1 by having a third user 4 joining them in said telephone call 1. To do so, one of the initial telephone terminal/user 2, 3, as illustrated in FIG. 2, initiates a consultation call 10 toward the third telephone terminal 4 of the third user 4. Such a consultation call 10 is triggered using some commands of the telephony system available e.g. from the telephone terminal 2 of the user 2. During said consultation call 10, the initial telephone call 1 may or not be put on hold.

Before said third user 4 can be of any help to the initial users 2, 3, he must be informed of the background of the telephone call 1, that is, the content of the conversation exchanged between the initial users 2, 3 from the start of said initial telephone call 1 until the consultation time must be recapitulated to him. This is usually done, according to prior art, by the initial user 2 who initiates said consultation call 10, advantageously using said consultation call 10, to retell said conversation to the third user 4.

Depending on the elapsed time between the beginning of said initial telephone call 1 and now/the consultation time, this recapitulation may be very time consuming. Moreover, other initial users 3, if they have been put on hold, are uselessly waiting. Most of all, since the retelling is done by a person, the conversation is necessarily summarized, and the summarizing process is not necessarily faithful, since it is prone to personal interpretation and also to, not necessarily willing, forgetting and/or omission, that may leads to loss of important information.

As illustrated in FIG. 3, when initial user 2 or/and third user 4 considers the recapitulation is sufficient, the third user 4 being aware of the content of the initial conversation before the third user 4 was consulted, user 2 decides to resume the initial call 1 with the initial users 2, 3 plus the third user 4 joining them in a telephone call 1 extended to the joining third user 4. The conversation can finally resume, with the contribution of added third user 4.

Alternately, as illustrated in FIG. 4, initial user 2 can transfer the initial call 1 and quit, leaving the added third user 4 in conversation in a telephone call 1 linking said third user 4 with some or all of the remaining initial user 3.

FIG. 5 illustrates a first step, in all points similar to the first step of FIG. 1. An initial telephone call 1 is already established between at least two initial telephone terminals 2, 3.

Let us considers now that, for any reason, a third user 4 is interested in joining said initial telephone call 1. Said third user 4 may be entitled to join said initial telephone call 1 as any user participating into a conference call. In such a case said third user 4 may both listen and talk in said telephone call 1 and his joining is known from the initial users. Said third user 4 may also be entitled to join said initial telephone call 1 as an observer. In such a case said third user 4 may listen and be allowed or not to talk. Depending on configuration his joining may be known from the initial users 2, 3, in somewhat may be called "listener" mode or may not be known from the initial users 2, 3, in somewhat may be called "spy" mode.

Figure 6:
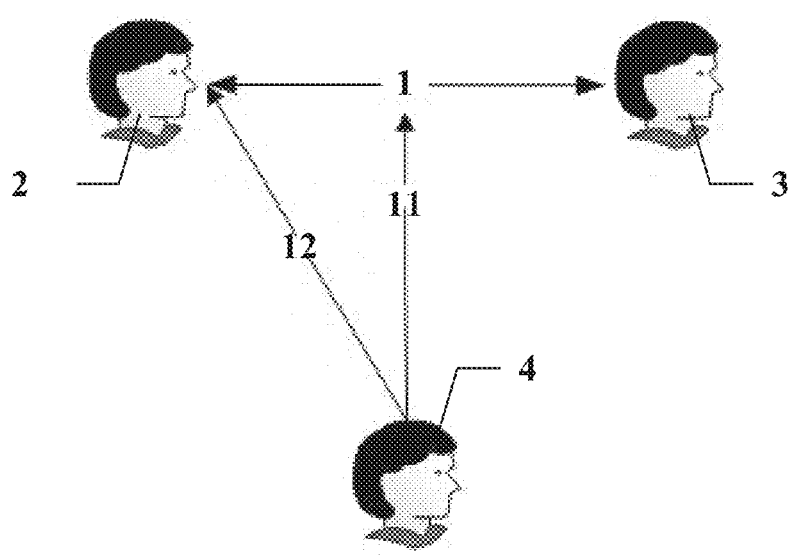

To do so, as illustrated in FIG. 6, the third telephone terminal/user 4 initiates an intrusion call 11 into said initial telephone call 1. Said intrusion call 11 is then triggered using some commands of the telephony system available e.g. from the third telephone terminal 4 of the third user 4.

The problem here is that the third user 4 has not followed the conversation between initial users 2, 3 since the beginning of the telephone call 1. To benefit from his intrusion into the telephone call 1 he should advantageously be informed of the background of the telephone call 1, that is, of the content of the conversation between the initial users 2, 3 exchanged from the start of said initial telephone call 1 until the intrusion time.

Said third user 4 has few to no means to get such a background. If his presence is known to the initial users 2, 3, the third user 4 can asks for their help. Then one of the initial users 2, 3 can recapitulate the past conversation to him. Such an approach suffers here from drawbacks similar to the ones in the consultation scenario: time consumption, useless wait or inactivity of initial users 2, 3 not involved in background recapitulation, not necessarily faithful summarize.

If his presence is known to at least one of the initial user 2, another possibility is to engage with said initial user 2 into another exchange 12, preferably not a speech one, e.g. to engage into an immediate messaging call 12. This allows said initial user 2 to provide some elements of said background by writing. However such a way of doing may be very disturbing to said initial user 2, already involved in the initial telephone call 1.

In the case where the third user's presence is not known, the third user 4 has no way to get said background. The third user 4 can only listen to the conversation on the telephone call 1, starting from his intrusion and try to imagine what is going on and what is discussed.

Figure 3:
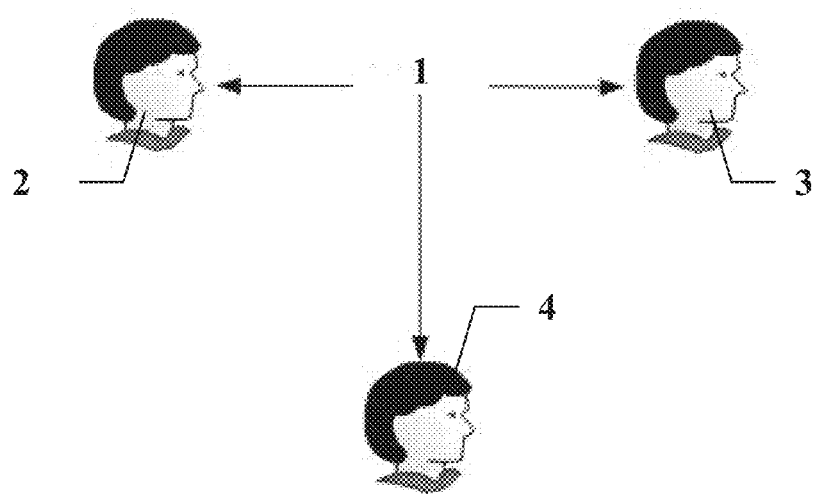
Figure 7:
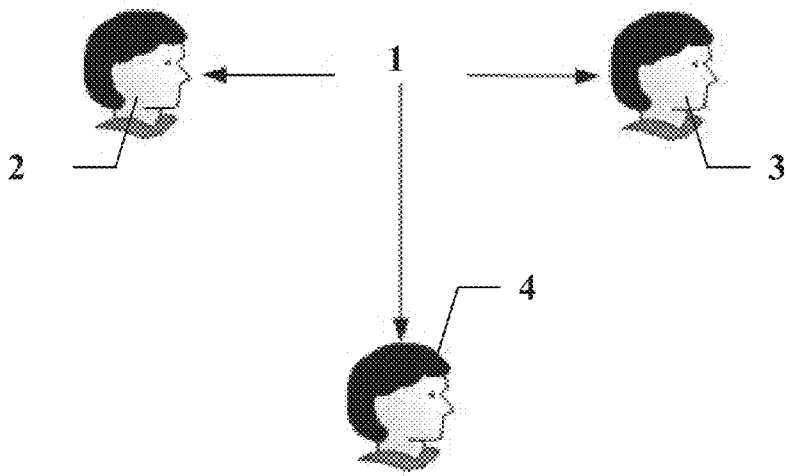

As illustrated at FIG. 7, whose configuration is very similar to the one of FIG. 3, at any moment, the third user 4 may decides to fully join the initial call 1 with the initial users 2, 3 in a telephone call 1 extended to the intruding third user 4.

Figure 4:
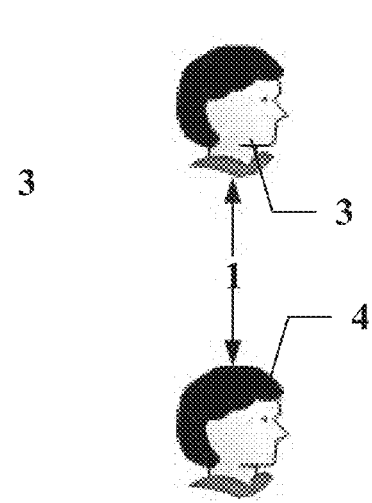
Figure 8:
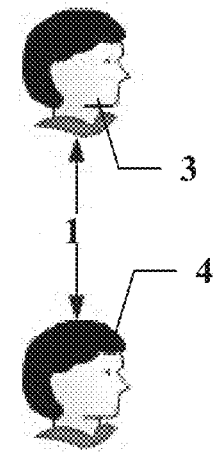

Alternately, as illustrated in FIG. 8, whose configuration is very similar to the one of FIG. 4, initial user 2 can transfer the initial call 1 and quit, leaving the added third user 4 in conversation in a telephone call 1 linking said third user 4 with some or all of the remaining initial user 3.

Both the consultation and the intrusion scenarios suffer from quite the same drawbacks. The main idea, to avoid said drawbacks, is to provide, to the attention of said third user 4, a text transcription 9 of the content of the conversation exchanged between the initial users 2, 3, from the start of the initial telephone call 1, at least until the consultation/intrusion time. Such a text transcription 9 is made automatically and by an automated device. It thus provides an immediate, faithful content of the conversation, without the need to bother or to overload any of the initial user 2, 3, and in a way not necessary visible to said initial users 2, 3. Said text transcription also provides, by reading, a genuine, quick, progressive and at his own rhythm, way for the third user 4 to gain knowledge of the background.

The invention will now be comparatively described applied to a consultation scenario, with references to FIGS. 9-12, and applied to an intrusion scenario, with reference to FIGS. 13-16.

Figure 9:
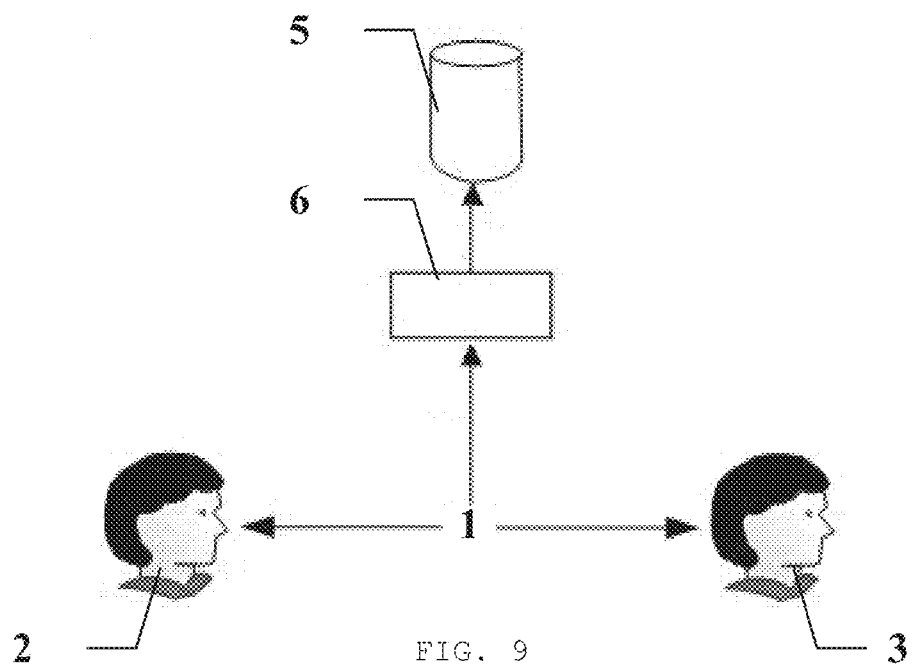

FIG. 9 illustrates a first step. There, an initial telephone call 1 is established between at least two initial telephone terminals 2, 3.

Since the beginning of said initial telephone call 1, that is, from the establishment of said initial telephone call 1, a call recording server 5 listens to said telephone call 1 and registers it.

Figure 10:
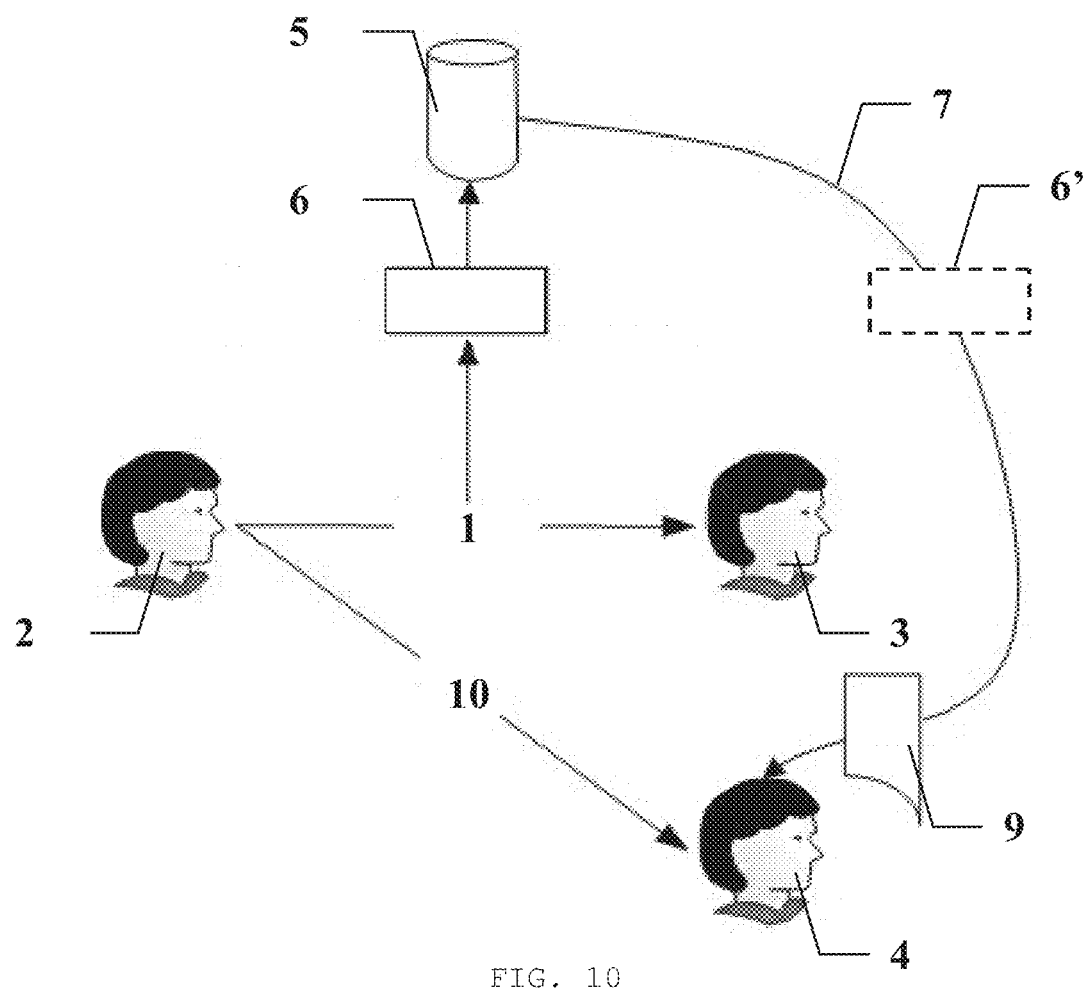

In the next step, illustrated by FIG. 10, one of the initial users, e.g. user 2, initiates a consultation call 10 toward a third telephone terminal 4 of a third user 4. Such a consultation call 10 is triggered using some commands of the telephony system available e.g. from the telephone terminal 2 of the user 2.

Such consultation call 10 also automatically triggers the providing, to the attention of said consulted third user 4, of a text transcription 9 of the initial telephone call 1. Said text transcription 9 can advantageously be obtained thanks to the previous recording applied to the initial telephone call 1. Said text transcription 9 is made from the telephone call 1, in speech form, by a speech to text engine 6, 6' able to automatically transcript the speeches exchanged between all the initial users 2, 3, along said initial telephone call 1.

Said text transcription 9 is provided, to said third telephone terminal 4 and advantageously displayed in text form so as to be read by said third user 4. By doing so, the third user 4 can easily gain knowledge of exactly what has been discussed before his consultation, between initial users 2, 3. The providing of said text transcription 9 is done by a providing means 7. Said providing means 7 is triggered by the initiation of the consultation call 10. Thus, when the third user 4 picks up his telephone terminal 4 to answer to the consultation call 10, the text transcription 9 can simultaneously be displayed to his attention.

The reading of said text transcription 9 by said third user 4 can advantageously be done more quickly than any prior art approach. Most of all, said text transcription 9 is an exact, objective and faithful record of the telephone call 1. The third user 4 can thus advantageously be aware of a more exact background, much faster.

Figure 11:
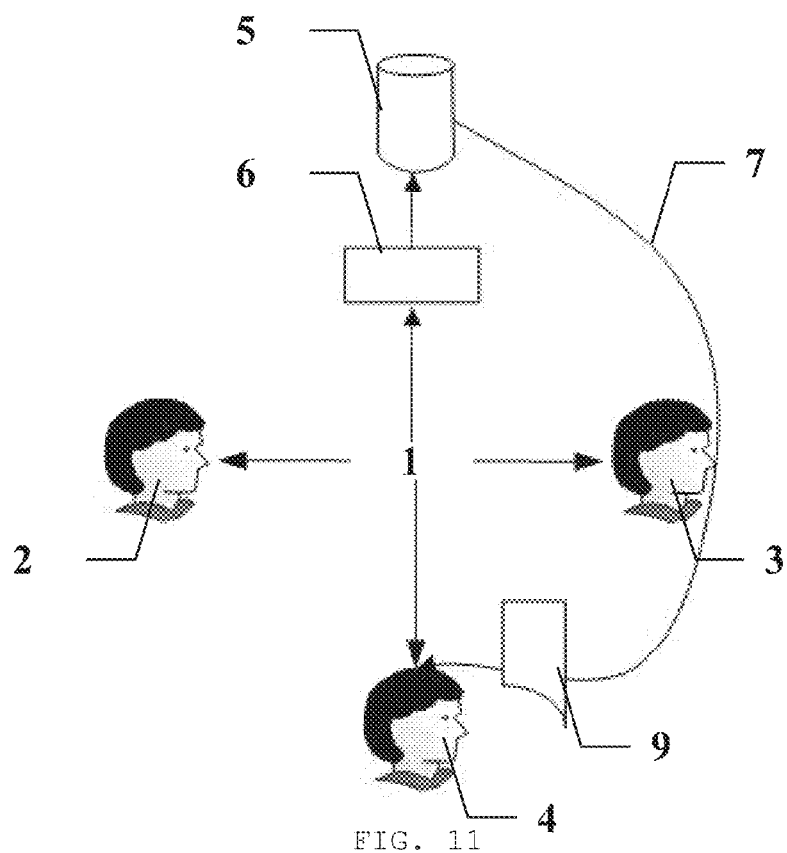

Additionally, this way of doing advantageously only involves the third user 4. Initial users 2, 3 are not necessary put on hold, obliged to wait or to retell in any way the telephone call 1. By doing so, the telephone call 1 can resume much faster, even automatically, with the initial users 2, 3 plus the third user joining them in a conference/telephone call 1 extended to the joining third user 4, as illustrated in FIG. 11.

Figure 12:
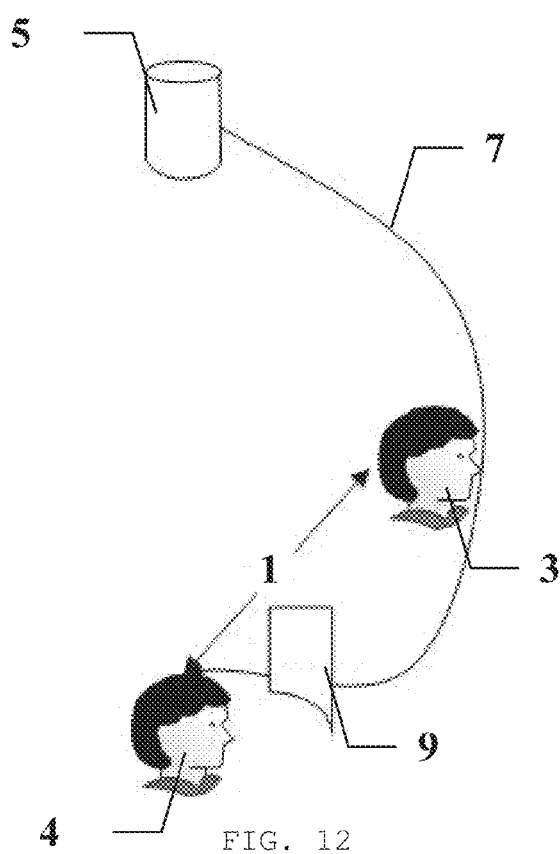

Alternately or later, as illustrated in FIG. 12, very similar to FIGS. 4 and 8, initial user 2 can transfer the initial call 1 and quit, leaving the added third user 4 in conversation in a telephone call 1 linking said third user 4 with some or all of the remaining initial user 3.

Figure 1:
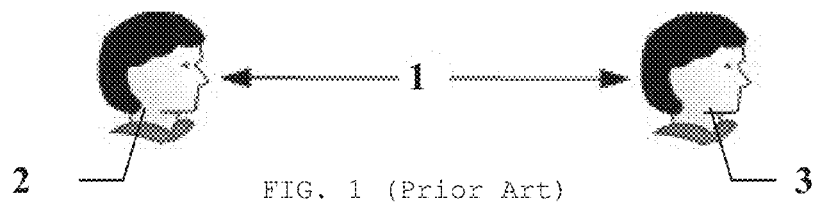
Figure 2:
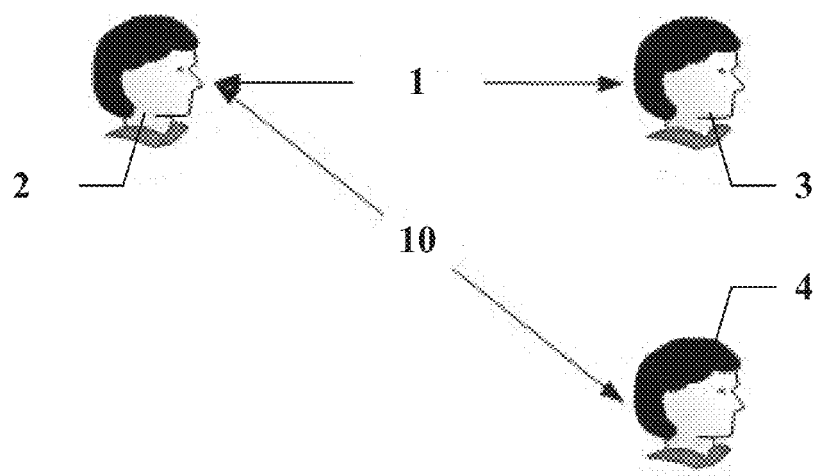
Figure 5:
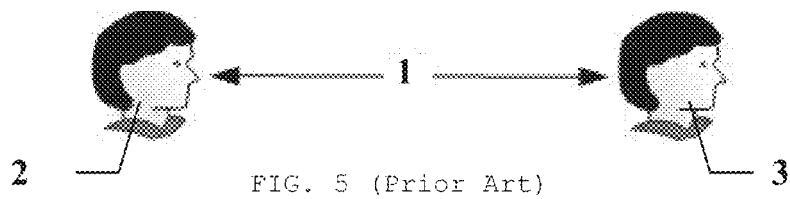
FIGS. 5-8 illustrate an intrusion scenario, according to prior art.
Figure 13:
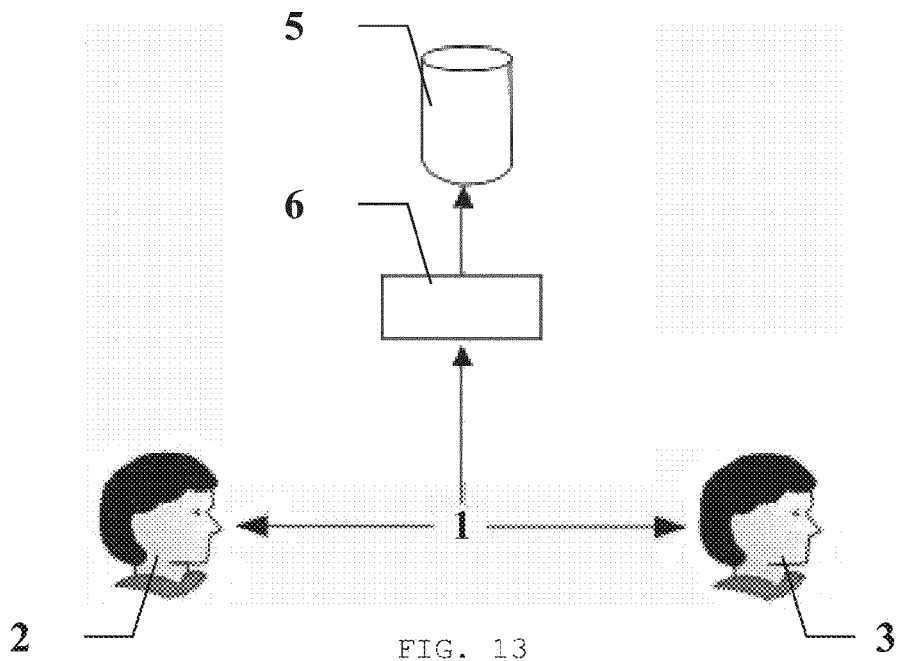

Similarly, when applied to an intrusion scenario, FIG. 13 illustrates a first step, in all points similar to the first step of FIGS. 1, 5 and 9. An initial telephone call 1 is already established between at least two initial telephone terminals 2, 3.

Here also, since the beginning of said initial telephone call 1, that is, from the establishment of said initial telephone call 1, a call recording server 5 listens to said telephone call 1 and registers it.

Then a third user 4 wants to join said initial telephone call 1, either in bidirectional mode, listen and talk, or in unidirectional mode, listen only, be it in "listener" mode or in "spy" mode.

Figure 14:
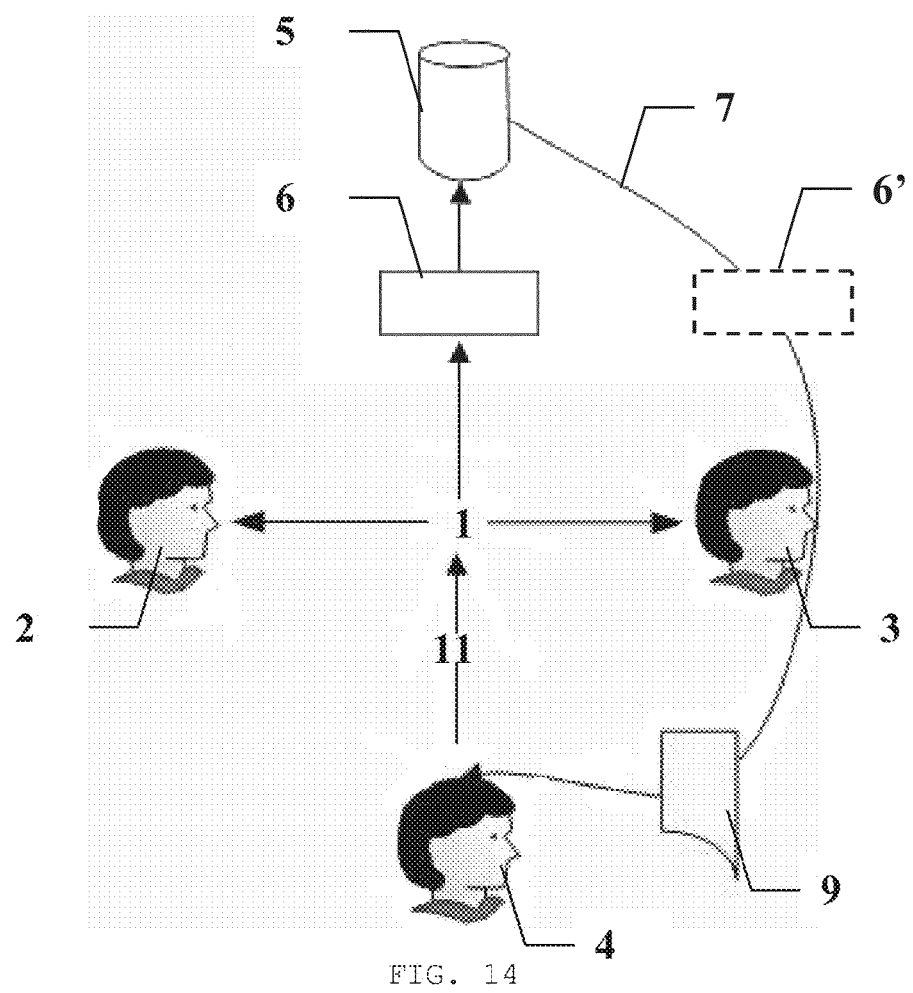

To do so, as illustrated in FIG. 14, the third user 4 initiates an intrusion call 11 into said initial telephone call 1.

Such initiation of an intrusion call 11 also automatically triggers the providing, to the attention of said intruding third user 4, of a text transcription 9 of the initial telephone call 1. Said text transcription 9 can advantageously be obtained thanks to the previous recording applied to the initial telephone call 1. Said text transcription 9 is made from the telephone call 1, in speech form, by a speech to text engine 6, 6' able to automatically transcript the speeches exchanged between all the initial users 2, 3, along said initial telephone call 1.

Said text transcription 9 is provided to said third telephone terminal 4 and advantageously displayed in text form so as to be read by said third user 4. By doing so, the third user 4 can easily gain knowledge of exactly what has been discussed before between initial users 2, 3. The providing of said text transcription 9 is done by a providing means 7. Said providing means 7 is triggered by the initiation of the intrusion call 11. Thus, when the third user 4 initiates said intrusion call 11 from his third telephone terminal 4, the text transcription 9 can simultaneously be displayed to his attention, in return.

The reading of said text transcription 9 by said third user 4 can be done more quickly than any prior art approaches. Most of all, said text transcription 9 is an exact, objective and faithful record of the telephone call 1. The third user 4 can thus advantageously be aware of a more exact background, much faster.

Additionally, this way of doing advantageously only involves the third user 4. Initial users 2, 3 are not necessarily out on hold, obliged to wait or to retell in any way the telephone call 1. They are even not obliged to be aware of the intrusion. This appears to be very advantageous when it comes to some "spy" modes.

Figure 15:
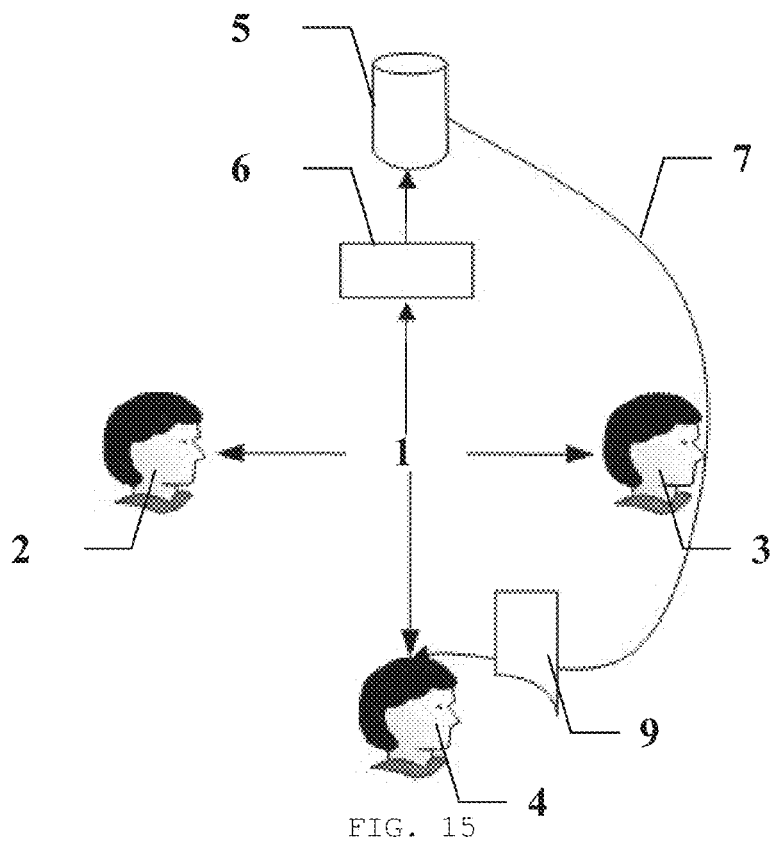

As for the consultation scenario case, by doing so, the telephone call 1 can resume much faster, even automatically, with the initial users 2, 3 plus the third user joining them in a conference/telephone call 1 extended to the joining third user 4, as illustrated in FIG. 15.

Figure 16:
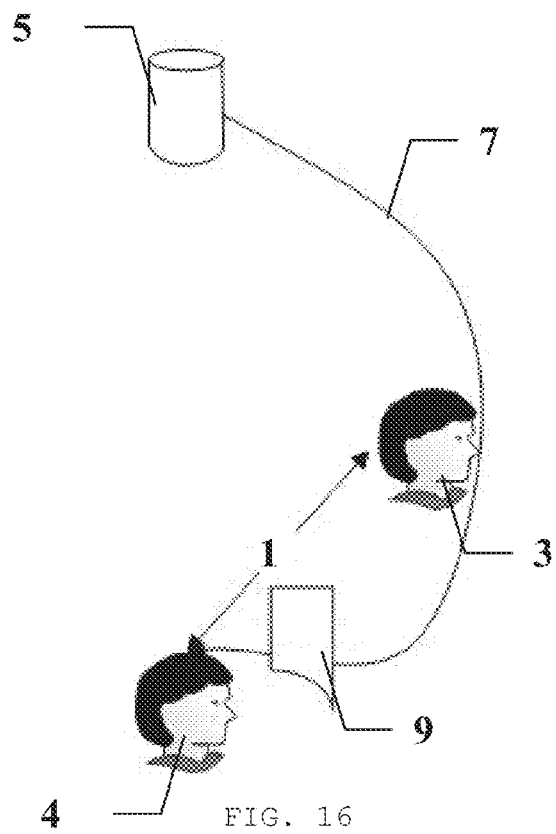

Alternately or later, as illustrated in FIG. 16, very similar to FIGS. 4, 8 and 12, initial user 2 can quit the telephone call 1, leaving the added third user 4 in conversation in a telephone call 1 linking said third user 4 with some or all of the remaining initial users 3.

Since the principles are now established, the following will describe some possible embodiments enabling them.

Figure 17:
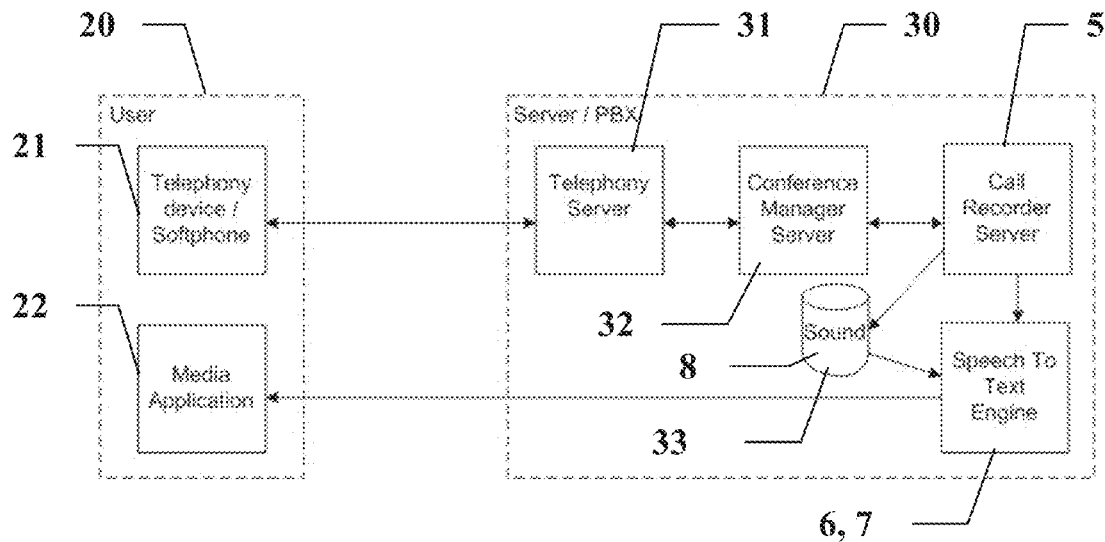
Figure 18:
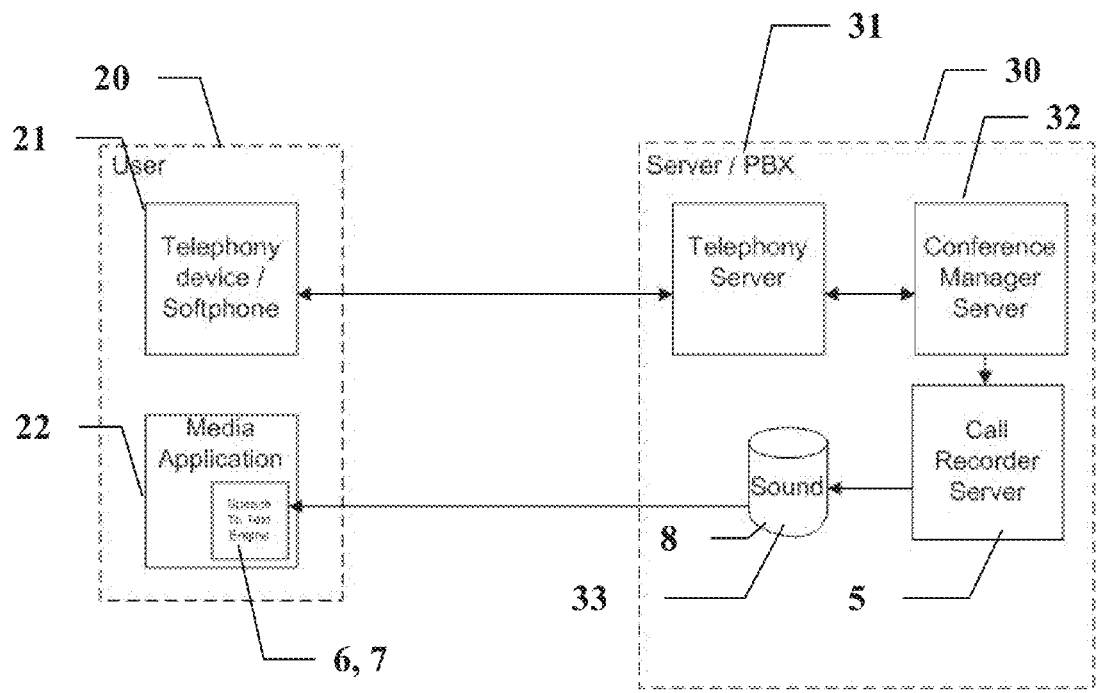
Figure 19:
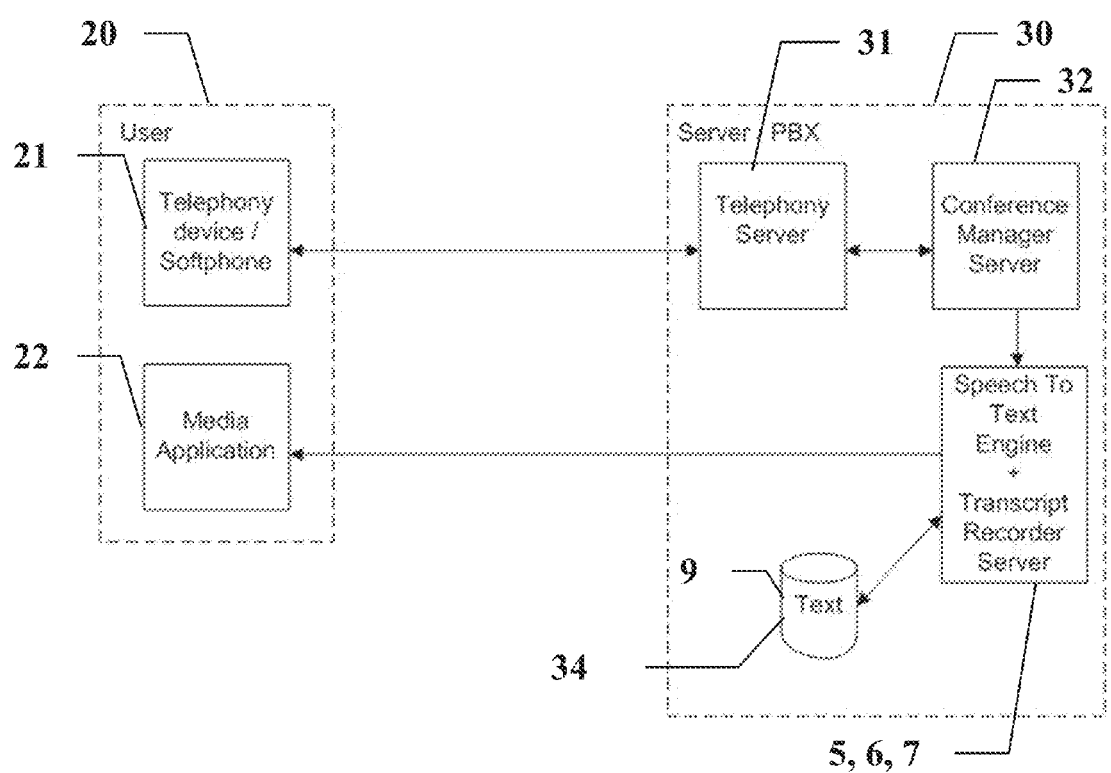

FIGS. 17-19 show three variant embodiments.

According to some embodiments, the telephony system comprises means to establish an initial telephone call 1 between at least two initial telephone terminals 2, 3 so as to link their respective users 2, 3. This means are usual in a telephony system and are known to the one skilled in the art. As such, they are not described in detail here.

More specific of some embodiments of the invention, are additional modules. In order to get a record of the telephone call 1, at least from its beginning till the time of the consultation or intrusion, a call recording server 5 is in charge of recording the initial telephone call 1 since its beginning.

In order to provide a text transcription 9 of the initial telephone call 1, a speech to text engine 6 is used. Such a speech to text engine 6 is known to be able to provide a text transcription 9, in readable text form, out of an audible conversation, here the telephone call 1, in audio or speech form. Such a speech to text engine 6 is known to the one skilled in the art and will not be described in detail here.

In addition, a providing mean 7 is in charge of providing said text transcription 9 to the third telephone terminal 4, to be displayed to the attention of the third user 4.

As can be derived from both scenarios, the providing of a text transcription is a good mean to recapitulate a conversation from a telephone call 1 to a third user 4. Consequently a registering of the whole telephone call 1 is necessary to provide such a text transcription 9. Consequently, said call recording server 5 must be operative to automatically start recording a telephone call 1 from the beginning of said initial telephone call 1. This can e.g. be done by having an action related to the initiation of a telephone call 1 triggering the start of the recording by said call recording server 5. Such an action can be any command of the telephony system related to the establishment of a call, such as the call command from the caller, or else the pick up from any one of the called users.

It can be also noted here, that since one cannot know in advance if a telephone call 1 would be either consulted or intruded, a telephone call 1 in a telephony system must be recorded by said call recording server 5 in order to be able to offer the background recapitulation feature for said telephone call 1.

To realise the previously described function of recording a telephone call 1 and then provide a text transcription 9 of said telephone call 1, at least two, non-exclusive, options are offered. These options are illustrated at least with reference to FIGS. 10 and 14.

According to a first option, the call recording server 5 directly stores a record of a telephone call 1 in speech form 8. This is easier to do, since it does not need any operation, the speech form 8 rather corresponding to the initial form of the telephone call 1 as exchanged between the initial users 2, 3. However, in this case the production of the text transcription 9 must be done at providing time, when the third user 4 is consulted or intrudes. This may be done by a speech to text engine 6' triggered at providing time. Such an approach is advantageous in that only a telephone call 1 that needs to be transcripted, because it is the target of a consultation 10 or of an intrusion 11, would be effectively transcripted. This lowers the computing capacity need. However, such an approach necessitates a fast speech to text engine 6' in order to build the text transcription 9 quickly enough to not have the third user 4 waiting for it.

According to a second option, the call recording server 5 may stores a record of a telephone call 1 in text transcription form 9. This is more complicated. It needs to process the telephone call 1 through the speech to text engine 6 before storing the telephone call 1 in the so obtained text transcription form 9. In this case the production of the text transcription 9 at providing time is very quick. Such an approach is advantageous in that it can cope with as slow speech to text engine 6. Another advantage of said second approach is that it lowers the storage capacity needed. Despites all the telephone call 1 are recorded, a telephone call 1 stored as a text transcription 9, e.g. coded in ASCII, is lighter in storage capacity than a telephone call 1 stored in speech form 8. However said second approach suffers from an increased computing capacity need due to the transcription process applied by the speech to text engine 6 to all telephone calls 1.

Any telephone call 1 that would offer the background recapitulation feature must be recorded by said call recording server 5 at least in one form among the speech form 8 and the text transcription form 9. It is also possible to have a telephone call 1 so recorded in both forms 8, 9.

The call recording server 5, in addition to storing telephone calls, is also acting as a server, and can deliver back a recorded telephone call 1 on demand. The recording of a telephone call 1 is active from its beginning to either its end, when all users have hanged up, or until a third user is either consulted or intrudes into said telephone call 1.

If the end of a telephone call 1 is reached, the record made by said call recording server 5 may be deleted to reduce the memory storage used.

If before the end, a consultation 10 or an intrusion 11 occurs, the call recording server 5 delivers back the record of said telephone call 1 on demand. Said demand typically comes from the providing means 7, when the telephone call 1 is recorded in text transcription form 9, to provide said text transcription 9 to the third user 4. Said demand typically comes from the speech to text engine 6, when the telephone call 1 is recorded in speech form 8, to build a text transcription form 9. Said text transcription 9 is then delivered to the providing mean 7, which in turn provides said text transcription 9 to the third user 4.

Accordingly, depending on the option, the speech to text engine 6 is either designed to make a text transcription 9 from said telephone call 1 directly on the fly, when the telephone call 1 occurs. In this case the recording of the telephone call 1 is done after the transcription, in text transcription form 9. In such a case the speech to text engine 6 is in position 6 in FIG. 10 or 14.

Or instead, the speech to text engine 6 may be designed to make a text transcription 9 from a telephone call 1 previously recorded in speech form 8 and delivered back, e.g. by the call recording server 5. In this case the telephone call 1 is recorded, before the transcription, in speech form 8. In such a case the speech to text engine 6 is instead in position 6' in FIG. 10 or 14.

Accordingly, depending on the option, the providing mean 7 gets the text transcription 9 either directly from said speech to text engine 6, when the telephone call 1 is recorded before the transcription in speech form 8, or from the call recording server 5, when the telephone call 1 is recorded after the transcription in text transcription form 9.

In all cases, the providing means 7 is triggered by a consultation 10 or by an intrusion 11.

In case of a consultation 10, the providing mean 7 is triggered from any one of the initial telephone terminals 2, 3, especially by the one, among said initial telephone terminals 2, 3, which establishes a consultation call 10 toward said third telephone terminal 4. At this instant, the text transcription 9 is transmitted to the third telephone terminal 4 to the attention of the third user 4.

In case of an intrusion 11, the providing mean 7 is triggered from said third telephone terminal 4, by said third telephone terminal 4 establishing an intrusion call 11 into said initial telephone call 1.

Different configurations in organic implementation will now be described with reference to FIGS. 17-19.

In all three illustrative implementations, the system can be parted into a user segment 20 and a server segment 30. Said user segment 20 typically comprises a telephone set 21. Such a telephone set 21 is a typical telephone set as is already known. It can be a desk telephone device or a mobile cellular device, such as a smartphone. Said user segment 20 further comprises a media application 22 comprising all components necessary to the implementation that cannot be necessary found in telephone set 21. E.g. depending on the displaying capacities of the telephone set 21, it may or not comprises a display evolved enough to display a text transcription 9 in order for it to be read by a user 4. A cellular mobile smartphone will typically comprise such an evolved display, while a desk telephone device would typically not comprise such an evolved display. In the case of a telephone set 21 not comprising such an evolved display, the media application 22 would then provide such an evolved display. In a desk environment, the media application 22 may e.g. use a desk personal computer to do so.

The server segment 30 comprises a telephony server 31 and a conference manager 32 in charge of respectively managing the general telephony functions and the conference functions, as is known in the art. These two components are present in all three configurations and are very similar to the ones found in prior art.

In all three configurations of FIGS. 17-19, a call recording server 5 interfaces with said conference manager 32 in order to record the telephone call 1.

In the configuration of FIG. 17, said call recording server 5 uses a storage means 33 to record telephone call 1 directly in speech form 8. At providing time, a speech to text engine 6 is triggered. The record in speech form 8 of the telephone call 1 is retrieved from said storage means 33 to be processed so as to build a text transcription 9. Here the providing means 7 can be considered to be joined with said speech to text engine 6. All these modules are located on the server segment 30. The produced text transcription 9 is transmitted to the telephone terminal 20.

In the configuration of FIG. 18, said call recording server 5 also uses a storage means 33 to record telephone call 1 directly in speech form 8. At providing time, the record in speech form 8 of the telephone call 1 is retrieved from said storage means 33 to be transmitted to the telephone terminal 20. Here, a local speech to text engine 6 is triggered to build a text transcription 9. Here the providing means 7 can be considered to be joined with said speech to text engine 6.

In the configuration of FIG. 19, said call recording server 5 also uses a storage means 34 to record telephone call 1, but in text transcription form 9. A speech to text engine 6 is thus used before/during recording time to build a text transcription 9 on the fly. Said text transcription 9 so obtained is then recorded in said storage means 34. By doing so, at providing time, the text transcription 9 is immediately available. The providing means 7 just has to retrieve it from said storage means 34 and to transmit it to the telephone terminal 20. Here, the three modules 5, 6, 7 can be considered to be joined together and are all located in the server segment 30.

These illustrative configurations are not limited. They can be combined to provide other configurations.

The invention claimed is:

1. A telephony system comprising:
   a processor; and
   a memory, wherein the memory stores instructions that, when executed by the processor, cause the processor to:
   establish a telephony session between a first communication appliance and a second communication appliance;
   record a conversation of the telephony session between the first communication appliance and the second communication appliance in response to establishing the telephony session;
   transfer the telephony session to a third communication appliance that subsequently joins the telephony session in response to receiving an intrusion request from the third communication appliance;
   automatically transcribe the recorded conversation into a text transcript in response to the transferring of the telephony session to the third communication appliance;
   disconnect the first communication appliance or the second communication appliance from the telephony session in response to the transferring of the telephony session to the third communication appliance to continue the telephony session between the third communication appliance and a remaining one of the first communication appliance and the second communication appliance; and
   provide the text transcript of the conversation to the third communication appliance in response to the transferring of the telephony session to the third communication appliance for causing display of the text transcript on a display device associated with the third communication appliance,
   wherein the text transcript comprises at least a portion of the conversation prior to the transferring of the telephony session to the third communication appliance.

2. The telephony system of claim 1, wherein the record of the conversation is stored in audio form.

3. The telephony system of claim 2, wherein the text transcript is created from the stored record at a time of the providing of the text transcript of the conversation to the third communication appliance.

4. The telephony system of claim 1, wherein the record of the conversation is stored in the text transcript form.

5. The telephony system of claim 1, wherein the record of the conversation starts from a beginning of the conversation to a time of the transferring of the telephony session to the third communication appliance.

6. A computer implemented method of providing recapitulation of a telephony session, the method comprising:
   Establishing, by a processor, the telephony session between a first communication appliance and a second communication appliance;
   Recording, by the processor, a conversation of the telephony session between the first communication appliance and the second communication appliance in response to establishing the telephony session;
   Transferring, by the processor, the telephony session to a third communication appliance that subsequently joins the telephony session in response to receiving an intrusion request from the third communication appliance;
   automatically transcribing, by the processor, the recorded conversation into a text transcript in response to the transferring of the telephony session to the third communication appliance;
   disconnecting, by the processor, the first communication appliance or the second communication appliance from the telephony session in response to the transferring of the telephony session to the third communication appliance to continue the telephony session between the third communication appliance and a remaining one of the first communication appliance and the second communication appliance; and
   providing, by the processor, the text transcript of the conversation to the third communication appliance in response to the transferring of the telephony session to the third communication appliance for causing display of the text transcript on a display device associated with the third communication appliance,
   wherein the text transcript comprises at least a portion of the conversation prior to the transferring of the telephony session to the third communication appliance.

7. The computer implemented method of claim 6, further comprising storing the record of the conversation in audio form.

8. The computer implemented method of claim 7, further comprising creating the text transcript from the stored record at a time of the providing of the text transcript of the conversation to the third communication appliance.

9. The computer implemented method of claim 6, further comprising storing the record of the conversation in the text transcript form.

10. The computer implemented method of claim 6, wherein the recording of the conversation starts from a beginning of the conversation to a time of the transferring of the telephony session to the third communication appliance.

11. The telephony system of claim 1, wherein the providing of the text transcript of the conversation to the third communication appliance is triggered from any one of the first and second communication appliances.

12. The telephony system of claim 1, wherein the third communication appliance comprises the display device associated with the third communication appliance.

13. The telephony system of claim 1, wherein the display device associated with the third communication appliance is external to the third communication appliance.

* * * * *